US012804328B2

(12) United States Patent
Tee et al.

(10) Patent No.: US 12,804,328 B2
(45) Date of Patent: Nov. 17, 2026

(54) ELECTRODYNAMIC LOUDSPEAKER WITH MICRO-ELECTROMECHANICAL SYSTEM

(71) Applicant: ZHEJIANG NORMAL UNIVERSITY, Jinhua (CN)

(72) Inventors: Clarence Augustine Teck Huo Tee, Jinhua (CN); Burhanuddin Yeop Majlis, Selangor (MY); Wey Ping Yeo, Selangor (MY); Gandi Sugandi, Selangor (MY)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 101 days.

(21) Appl. No.: 19/076,098

(22) Filed: Mar. 11, 2025

(65) Prior Publication Data

US 2026/0222742 A1 Jul. 30, 2026

(30) Foreign Application Priority Data

Jan. 24, 2025 (CN) ........................ 202510117595.7

(51) Int. Cl.

| | |
|---|---|
| ***H04R 9/06*** | (2006.01) |
| ***H04R 3/00*** | (2006.01) |
| ***H04R 7/04*** | (2006.01) |
| ***H04R 7/16*** | (2006.01) |
| ***H04R 9/02*** | (2006.01) |
| ***H04R 9/04*** | (2006.01) |

(52) U.S. Cl.

CPC ................ *H04R 9/06* (2013.01); *H04R 3/00* (2013.01); *H04R 7/04* (2013.01); *H04R 7/16* (2013.01); *H04R 9/025* (2013.01); *H04R 9/047* (2013.01); *H04R 2201/003* (2013.01); *H04R 2307/027* (2013.01)

(58) Field of Classification Search

CPC ... H04R 9/06; H04R 7/04; H04R 7/16; H04R 9/025; H04R 2201/003; H04R 2307/027

USPC ........................................ 381/111, 116, 117

See application file for complete search history.

(56) References Cited

FOREIGN PATENT DOCUMENTS

CN 106911990 A * 6/2017 ............ H04R 31/00

* cited by examiner

*Primary Examiner* — George C Monikang
(74) *Attorney, Agent, or Firm* — Birchwood IP

(57) ABSTRACT

Disclosed is an electrodynamic loudspeaker with a micro-electromechanical system (MEMS). The MEMS loudspeaker is assembled and structured through at least one liquid metal diaphragm, including: a noise reduction module, configured to reduce noise without need for a plurality of software interfaces; a static part, including at least one silicon framework, where the silicon framework serves as a general magnet platform; and a movable part, including at least one liquid metal diaphragm, where the liquid metal diaphragm is fixed to a top of the silicon framework, the liquid metal diaphragm serves as a component of at least one microphone or loudspeaker, and the liquid metal diaphragm is made of a gallium or indium alloy material. The original design is profoundly changed in the fields of materials science, power systems, acoustic effect optimization and the like. The inventive step significantly enhances acoustic quality, energy efficiency, and customization capabilities.

10 Claims, 5 Drawing Sheets

ELECTRODYNAMIC LOUDSPEAKER WITH MICRO-ELECTROMECHANICAL SYSTEM

CROSS-REFERENCE TO RELATED APPLICATIONS

This application claims priority to Chinese Patent Application No. 202510117595.7, filed on Jan. 24, 2025, which is hereby incorporated by reference in its entirety.

TECHNICAL FIELD

The present disclosure relates to the technical field of loudspeakers, and in particular to an electrodynamic loudspeaker with a micro-electromechanical system (MEMS).

BACKGROUND

A micro-electromechanical system (MEMS) involves a technology of integrating computers and miniature mechanical devices (such as sensors, valves, gears, mirrors, and actuators) into semiconductor chips. Essentially, an MEMS device includes a micro silicon chip that integrates certain mechanical components such as mirrors or sensors. Low-cost mass production of such chips is promising, and the chips are cost-effective in many applications. With the rise of the electronic industry, there is a growing market demand for various embedded audio devices, at least including multimedia and mobile devices, such as hearing aids, headphones (headsets), mobile phones, smartphones, PDAs, tablets, and personal computers. These devices need to be thinner without impairment to performance enhancement, and proper structural integration of same in some small devices must be ensured.

MEMS technology can be deemed as an alternative suitable for development of mini-micro loudspeaker technologies and structures. This technology ultimately enables high-precision manufacturing, uniform acoustic structures, and improved batch processing capabilities, such that final manufacturing costs are sufficiently low, which is currently impossible for small loudspeakers, although the technology has been applied to macro precision machining techniques to some extent.

At present, still limited efforts have been exerted to develop such small devices by using traditional techniques to optimize performance parameters such as acoustic quality and acoustic pressure and reduce energy consumption. Development of these small devices is limited mainly because technical complexities of integration and structural requirements ultimately lead to significant reductions in physical sizes of micro loudspeakers. Although some efforts have been made in development of electrodynamic MEMS loudspeakers, acoustic performance (such as acoustic quality and sound pressure level) of such loudspeakers is still inferior to that of traditional micro loudspeakers.

The reasons for occurrence of the foregoing problems include non-uniformity of a movable part of the loudspeaker, which involves a deformable diaphragm, a lead (an interconnection) between a planar coil and contact pads, and a small electromagnetic force generated between the coil and a magnet, where nonlinear behaviors of electromagnetic forces, and numerous structural modes lead to a certain degree of acoustic distortion. In view of the problems existing in the conventional technology and prior art, there is an urgent need to provide a small MEMS loudspeaker that is capable of achieving an improved broadband acoustic effect and maintaining consistent playback quality.

SUMMARY

In order to overcome the defects in the prior art, a main objective of the present disclosure is to provide an electrodynamic loudspeaker with a micro-electromechanical system (MEMS).

The technical solution employed by the present disclosure for achieving the above technical objective is as follows: an electrodynamic loudspeaker with an MEMS, including an MEMS loudspeaker, where the MEMS loudspeaker is assembled and structured through at least one liquid metal diaphragm, including:

(a) a noise reduction module, configured to reduce noise without need for a plurality of software interfaces;

(b) a static part, including at least one silicon framework, where the silicon framework serves as a general magnet platform; and (c) a movable part, including at least one liquid metal diaphragm, where the liquid metal diaphragm is fixed to a top of the silicon framework, the liquid metal diaphragm serves as a component of at least one microphone or loudspeaker, and the liquid metal diaphragm is made of a gallium or indium alloy material.

Preferably, connectors are further included, where the connectors exist in the form of at least one lead, and a plurality of arms that constitute connecting arms are formed.

Preferably, thin conductor connecting arms are further included, where the thin conductor connecting arms are uniformly and diagonally distributed on arms of the liquid metal diaphragm.

Preferably, the thin conductor connecting arms are configured to connect at least one planar micro-coil and a plurality of the connecting arms.

Preferably, the liquid metal diaphragm employs a stiffness adjustment mechanism to improve movement accuracy and extend an operational bandwidth, and serves as an insulating layer that separates at least one planar micro-coil from the connecting arms.

Preferably, the MEMS loudspeaker includes an acoustic aperture configured to release air in a back cavity beneath a diaphragm to an external environment.

Preferably, the silicon framework includes a first silicon framework and a second silicon framework, where the first silicon framework serves as a movable part of the MEMS loudspeaker, and the second silicon framework serves as a static part of the MEMS loudspeaker.

Preferably, the static part includes the silicon framework as a permanent magnet platform, an acoustic aperture, and a permanent magnet.

Preferably, the liquid metal diaphragm is forcibly moved by an electric actuator and is connected to a center of the liquid metal diaphragm.

Preferably, the thin conductor connecting arms are symmetrically distributed on the liquid metal diaphragm and move in a manner of piston motion.

Preferably, the liquid metal diaphragm is suspended on a diagonal spring structure of the thin conductive connecting arms, such that the thin conductor connecting arms are uniformly distributed on the arms of the liquid metal diaphragm.

Preferably, the thin conductor connecting arms are protected by the liquid metal diaphragm, and the liquid metal diaphragm serves as a dielectric layer that separates at least one connector from the planar micro-coil.

Compared with the prior art, the present disclosure has the beneficial effects as follows:

In the device with the MEMS loudspeaker, the loudspeaker is assembled and structured through at least one liquid metal diaphragm, the noise reduction module is configured to reduce noise without need for a plurality of software interfaces, the static part serves as the general magnet platform, and the movable part is configured to enable the liquid metal diaphragm to serve as a component of at least one microphone or loudspeaker. Moreover, a mechanism of improving and fine-tuning the stiffness of the liquid metal diaphragm ensures higher reliability and precision, such that the diaphragm maintains optimal motion characteristics and better adapts to different frequencies and environmental conditions. The original design is profoundly changed in the fields of materials science, power systems, acoustic effect optimization and the like, and technologies of quantum computing, the liquid metal diaphragm, wireless power transmission, and nanofabrication are integrated. The inventive step significantly enhances acoustic quality, energy efficiency, and customization capabilities.

BRIEF DESCRIPTION OF DRAWINGS

To describe the technical solutions in the examples of the present disclosure more clearly, the accompanying drawings required for describing the examples are briefly described below. Apparently, the accompanying drawings in the following description show merely some examples of the present disclosure, and those of ordinary skill in the art may still derive other drawings from these accompanying drawings without creative efforts.

Figure 1:
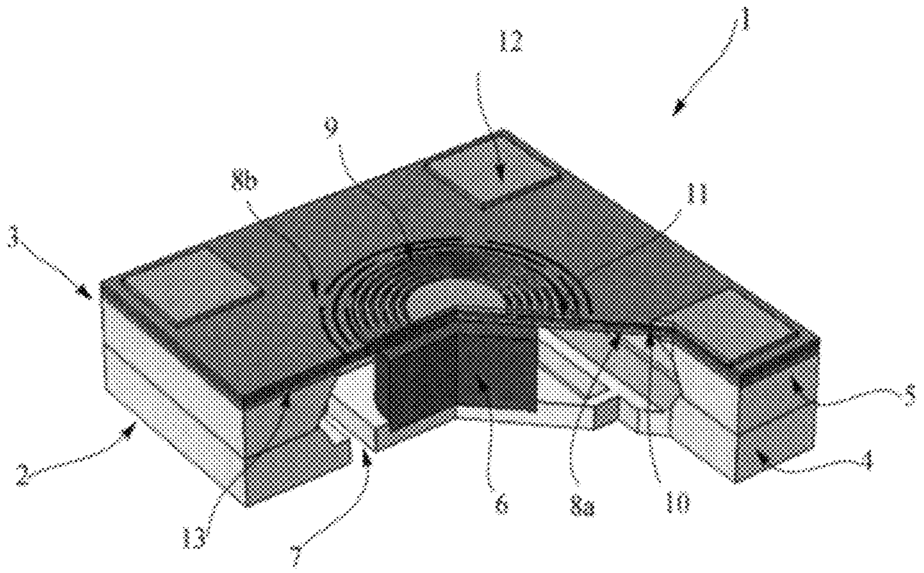
FIG. 1 is a cross-sectional perspective view of a device with an MEMS loudspeaker.

Reference numerals in the figures: 1, MEMS loudspeaker; 2, static part; 3, movable part; 4, first silicon framework; 5, second silicon framework; 6, permanent magnet; 7, acoustic aperture; 8, liquid metal diaphragm; 9, planar micro-coil; 10, thin conductor connecting arm; 11, connector; 12, contact pad; and 13, liquid metal diaphragm arm.

DESCRIPTION OF EMBODIMENTS

The foregoing are merely preferred examples of the present disclosure and are not intended to limit the present disclosure. Any modifications, equivalent replacements and improvements made within the scope of the principles of the present disclosure shall fall within the protection scope of the present disclosure.

Generally, the present disclosure can be implemented in a single chip and serve as an electronic element for audio signal processing. The chip is programmable and configurable, and capable of performing more complex tasks such as microphone array signal processing through connection and combination of a plurality of identical chips. Each chip can be used as an independent module and be configured as an element with one or more audio signal processing functions. Each chip can be as small as a resistor or capacitor in size, and has low power consumption and potential of low-cost mass production. Therefore, the present disclosure can be implemented as an electronic element in system designs for various applications.

Example 1

As shown in FIGS. 1-6, in an example of the present disclosure, there is provided an electrodynamic loudspeaker with an MEMS, and the loudspeaker is preferably provided with a pair of stators and a diaphragm located between the stators. The loudspeaker converts an electrical audio input into an acoustic output. Furthermore, a first dynamic loudspeaker and a second dynamic loudspeaker are further included. All loudspeakers are housed in an assembly, and acoustic radiation openings at front faces thereof are substantially coplanar. The first dynamic loudspeaker is enclosed, such that any acoustic output is essentially discharged from the enclosure through a front opening of the loudspeaker. The first dynamic loudspeaker is powered through a first crossover network to receive an audio input in a bass range below a first cutoff frequency. The second dynamic loudspeaker is installed in the device, such that any acoustic output is discharged through front and rear openings of the loudspeaker.

The present disclosure provides an electrodynamic loudspeaker with an MEMS, the loudspeaker is assembled and structured through at least one liquid metal diaphragm 8, and the liquid metal diaphragm 8 can serve as part of a microphone or loudspeaker. Furthermore, the device includes: a noise reduction module, configured to reduce noise without need for a plurality of software interfaces; a static part 2, including at least one silicon framework designed as a general magnet platform; and a movable part 3, including at least one liquid metal diaphragm 8, where the diaphragm is fixed on the top of the silicon framework.

The subject matter disclosed and claimed by the present disclosure further relates to a system and method applicable to various client devices, including but not limited to desktop computers, PDAs, smartphones, mobile phones, tablets, laptops, and any electronic/electrical devices containing loudspeakers. Therefore, although the subject matter disclosed and claimed may be embodied in various forms, the accompanying drawings and discussions are intended to illustrate the principles and are not intended to limit any example disclosed.

The following detailed description aims to provide exemplary implementations for those skilled in the art and is not intended to limit the subject matter disclosed and claimed to the explicitly disclosed content, because those skilled in the art will understand that changes may be made within the scope of the subject matter disclosed and claimed.

Voice signals captured by traditional microphones are usually susceptible to noise interference, thereby diminishing perceptual quality and intelligibility of the voice.

In addition, noise in the voice may degrade the performance of an Automatic Speech Recognition (ASR) system, thereby reducing accuracy thereof. Generally, a voice system/device reduces noise in voice signals through a noise reduction or noise cancellation module so as to maintain overall voice quality. Traditionally, the voice system/device employs a general digital signal processor (DSP) or a central processing unit (CPU) to execute these techniques in combination with other applications. In the present disclosure, the entire noise reduction function is implemented on the liquid metal diaphragm, and the diaphragm can serve as a component of an electronic device such as a microphone or loudspeaker. In the present disclosure, the noise reduction module can be easily integrated into an application system without concerns about software interfaces or computational power of the general CPU.

A quantum-driven adaptive audio system is introduced to replace basic artificial intelligence calibration. A quantum sensor and quantum dots embedded in the diaphragm are utilized by the system to adjust frequency response at a molecular level. A quantum algorithm enables to adjust environmental audio effects in real time and optimize acoustic effects according to user preferences and surrounding acoustic conditions.

Furthermore, wireless power transmission based on magnetic induction is achieved without reliance on traditional wired power sources any longer. The method enables wireless power transmission from an external source to the loudspeaker, thereby achieving continuous power supply without need of battery. Moreover, magnetic resonance further enhances a range and efficiency of power transmission. Additionally, traditional MEMS fabrication technology is replaced by nanofabrication technology, and scalable and modular production is achieved.

The present disclosure will be described in further detail below with reference to the accompanying drawings separately or in combination.

As shown in FIG. 1, to achieve the above objective of the present disclosure, an electrodynamic loudspeaker with an MEMS includes an MEMS loudspeaker 1 composed of at least two parts, such as a static part 2 for sound generation and a movable part 3. Furthermore, the static part 2 includes a silicon framework as a permanent magnet platform or any suitable silicon framework 4, as well as an acoustic aperture 7 and a permanent magnet 6. A structure of the static part of the device generally has a standard shape to accommodate a stator assembly of the electrodynamic MEMS loudspeaker.

In a preferred example, a structure of the movable part 3 differs from that of an ordinary diaphragm, including a liquid metal diaphragm 8 (further including 8*a* and 8*b*) fixed on the top of a second silicon framework 5.

In this example, an electrostatic loudspeaker system is further provided, including a first electrostatic loudspeaker element provided with a first pair of stators and a first diaphragm located between the stators. The first diaphragm has a first area. The first electrostatic loudspeaker element is configured to couple with a first electrostatic loudspeaker driving circuit to receive audio signals above a first predetermined frequency. The electrostatic loudspeaker system further includes a second electrostatic loudspeaker element provided with a second pair of stators and a second diaphragm located between the stators. An area of the second diaphragm is greater than that of the first diaphragm.

Additionally, an interconnection is realized in the form of lead to form thin conductor connecting arms 10, and the thin conductor connecting arms 10 are uniformly distributed on the liquid metal diaphragm 8 and connected to a planar micro-coil 9 through contact pads 12. The thin conductor connecting arms 10 are uniformly and diagonally distributed on arms of the liquid metal diaphragm 8, which facilitates connecting to the planar micro-coil 9 and the contact pads 12 through connectors 11 between two assemblies. The thin conductor connecting arms 10 are embedded in the liquid metal diaphragm 8, diagonally distributed and protected by the liquid metal diaphragm 8, which serves as an insulating layer to separate the planar micro-coil 9 from the thin conductor connecting arms 10. As shown in FIG. 1, the thin conductor connecting arms 10 have a symmetrical structure that enables piston-like movement motion in the diaphragm, which generates acoustic pressure and reduces high power consumption.

In a preferred example, at least two microfabricated silicon frameworks are included: a first silicon framework 4 and a second silicon framework 5, where the first silicon framework 4 is a microfabricated flexible membrane or a diaphragm located on a silicon wafer, serving as an acoustic generation part, and the second silicon framework 5 is a microfabricated silicon wafer, serving as a permanent magnet platform.

Figure 2:
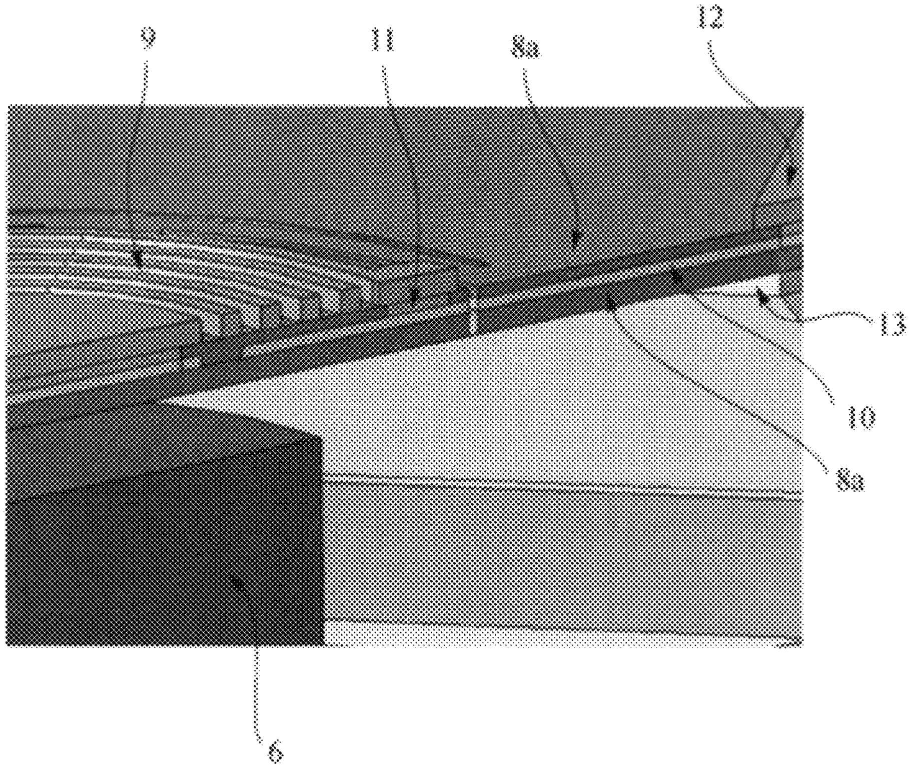
FIG. 2 is a more detailed cross-sectional enlarged perspective view of a device with an MEMS loudspeaker provided with a liquid metal diaphragm.

In a preferred example, an acoustic aperture 7 is further included to release air in a rear cavity or chamber beneath the diaphragm, until sufficient air is released to an external environment. The two silicon frameworks are combined to form an integrated electrodynamic MEMS loudspeaker device, as shown in FIGS. 1 and 2. The first silicon framework 4 is deemed as a movable part of acoustic generation, and the second silicon framework 5 is deemed as a static part of the device.

Figure 3:
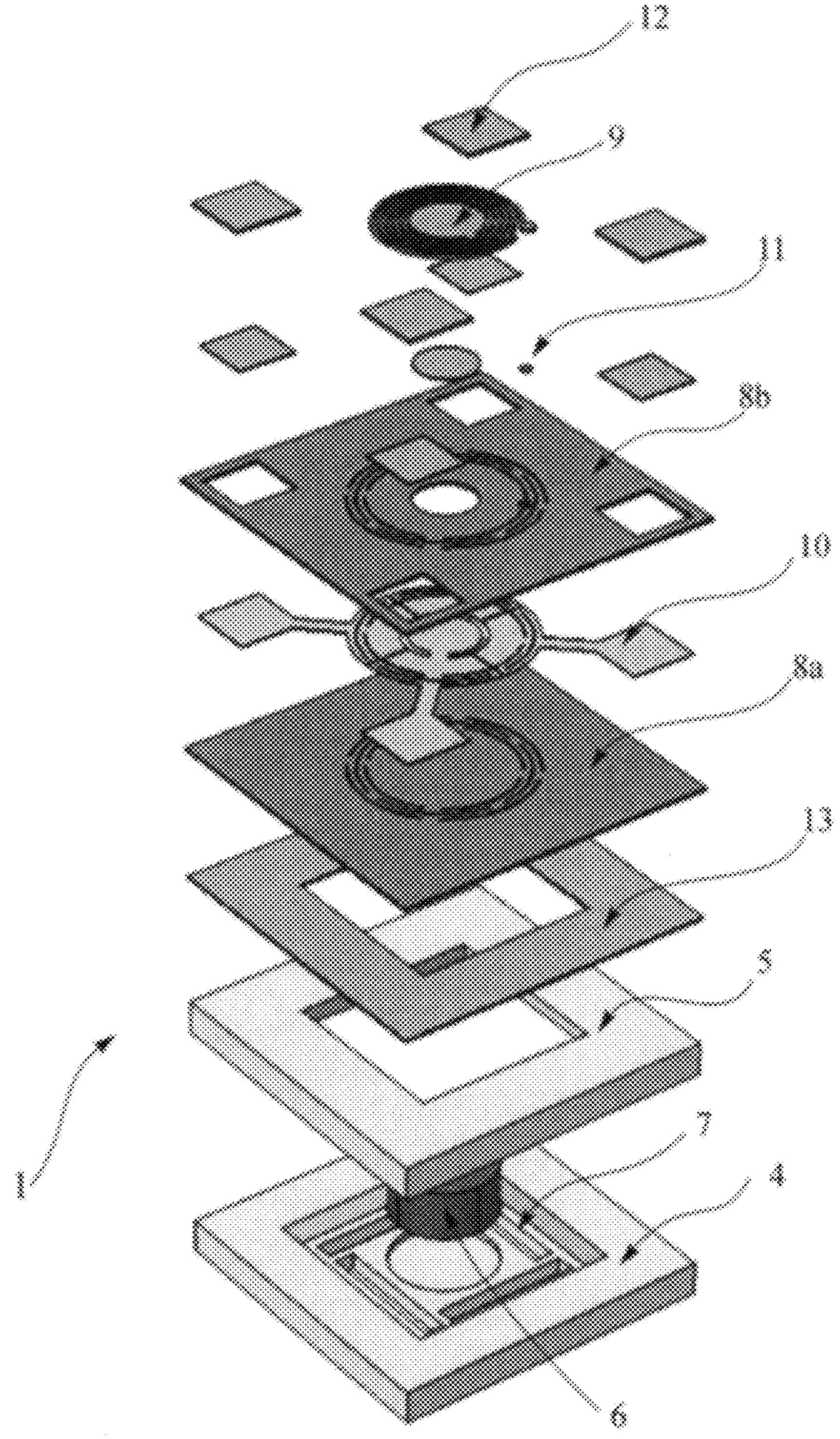
FIG. 3 is a detailed exploded view of various components of a device with an MEMS loudspeaker.

In a preferred example, with reference to FIG. 3, the static part 2 includes the silicon framework 4 as the permanent magnet platform, the acoustic aperture 7, and the permanent magnet 6. The movable part 3 induces an air pressure differential caused by use of the liquid metal diaphragm 8*a*-8*b* or a dynamic structure. The liquid metal diaphragm 8*a*-8*b* is forcibly moved by an electric actuator and is connected to a center of the diaphragm.

In a preferred example, to enhance displacement of the diaphragm, the liquid metal diaphragm 8 is used. Additionally, the liquid metal diaphragm is made of a gallium or indium alloy material to ensure linear movement of the diaphragm. Furthermore, a thin interconnection structure is uniformly distributed across the diaphragm to ensure that the diaphragm can move in a manner of "piston-like motion".

The thin conductor connecting arms 10 are isolated and protected by the liquid metal diaphragm 8 to prevent cracking of the diaphragm during the movement. The liquid metal diaphragm 8*b* also acts as a dielectric layer that isolates the thin conductor connecting arms 10 from the planar micro-coil 9. The liquid metal diaphragm 8*b* as a rigid membrane structure is diagonally suspended on the liquid metal diaphragm 8 with spring arms. Transmission of electrical signals to the planar micro-coil 9 causes the liquid metal diaphragm 8 to vibrate, and electrical signals are connected to the contact pads 12 through the connectors 11.

In a preferred example, a precise adjustment mechanism is used to enhance stiffness of the liquid metal diaphragm 8, including a pre-strain method for material thickness optimization and integration. These improvements enable the diaphragm to maintain the piston-like motion under high stress and variable frequency conditions, thereby ensuring stable performance.

Figure 4:
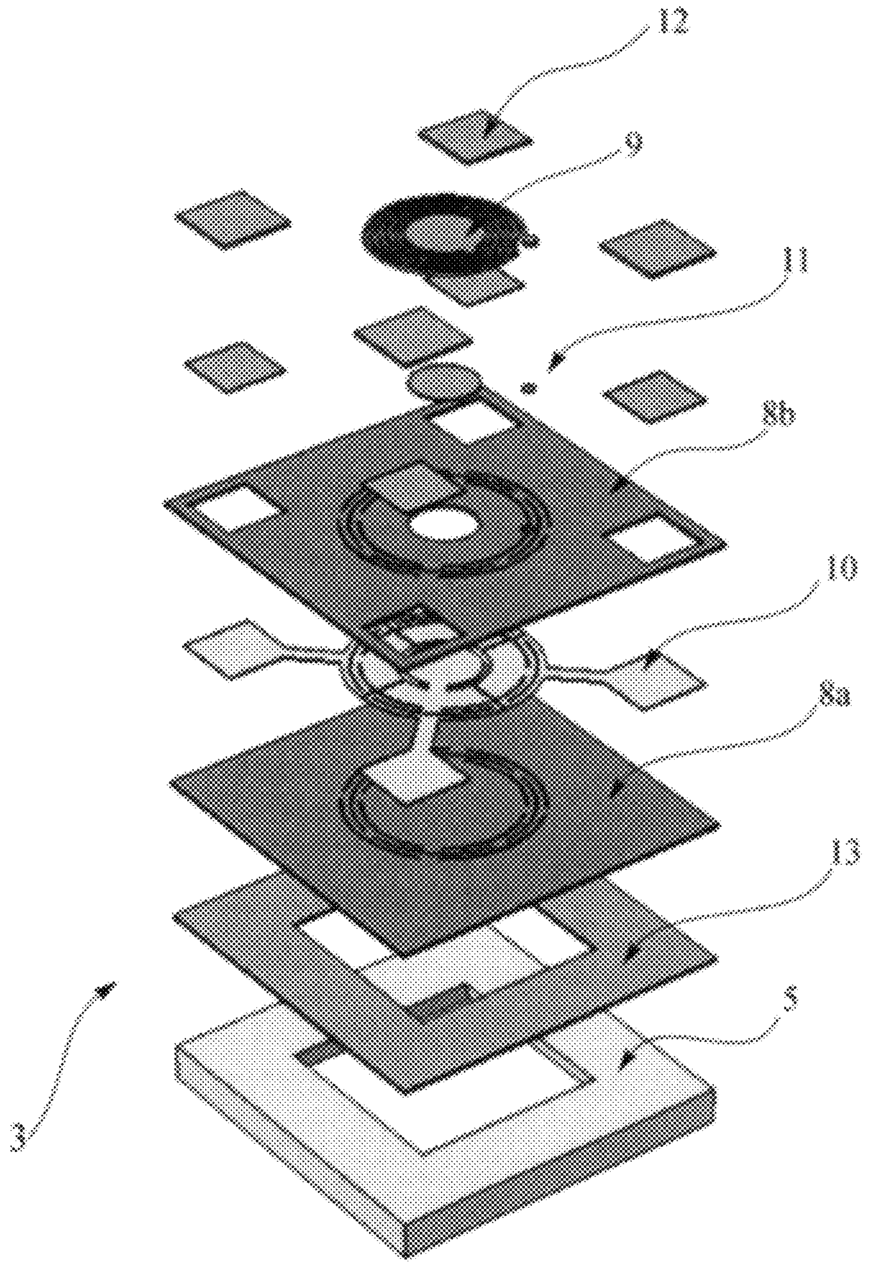
FIG. 4 is an exploded perspective view of a movable part of a device with an MEMS loudspeaker.

In a preferred example, as shown in FIG. 4, the movable part 3 is a part that causes the air pressure differential of the liquid metal diaphragm 8 or the dynamic structure. The liquid metal diaphragm 8 is forcibly moved by an electrodynamic actuator and is connected to the center of the diaphragm. Additionally, to optimize the displacement of the diaphragm, a liquid metal diaphragm material is used, which also helps to maintain the linear movement of the diaphragm. In addition, the thin conductor connecting arms 10 are uniformly distributed on the liquid metal diaphragm 8 to ensure the diaphragm can move in a manner of "piston-like motion". The thin conductor connecting arms 10 are isolated and protected by the liquid metal diaphragm 8 to prevent cracking of the diaphragm during the movement. The liquid metal diaphragm 8*b* also acts as a dielectric layer that separates the thin conductor connecting arms 10 from the planar micro-coil 9.

In a preferred example, the thin conductor connecting arms 10 have a symmetrical structure. Moreover, a center of the liquid metal diaphragm 8 is suspended on a diagonal spring structure to allow for uniform distribution, and through such a movable part structure, the diaphragm as an acoustic reproduction component, can move in a manner of "piston-like motion". Additionally, this structure can enhance a frequency bandwidth, thereby increasing an overall bandwidth.

A structure of the multi-turn planar micro-coil 9 can be fabricated on the top and/or bottom of the diaphragm in a single-layer or double-layer form, and a stacked design can further enhance efficiency of the device. Such change is attributed to use of a longer coil, and an improved electromagnetic force can be generated even under low power consumption conditions.

Example 2

Figure 5:
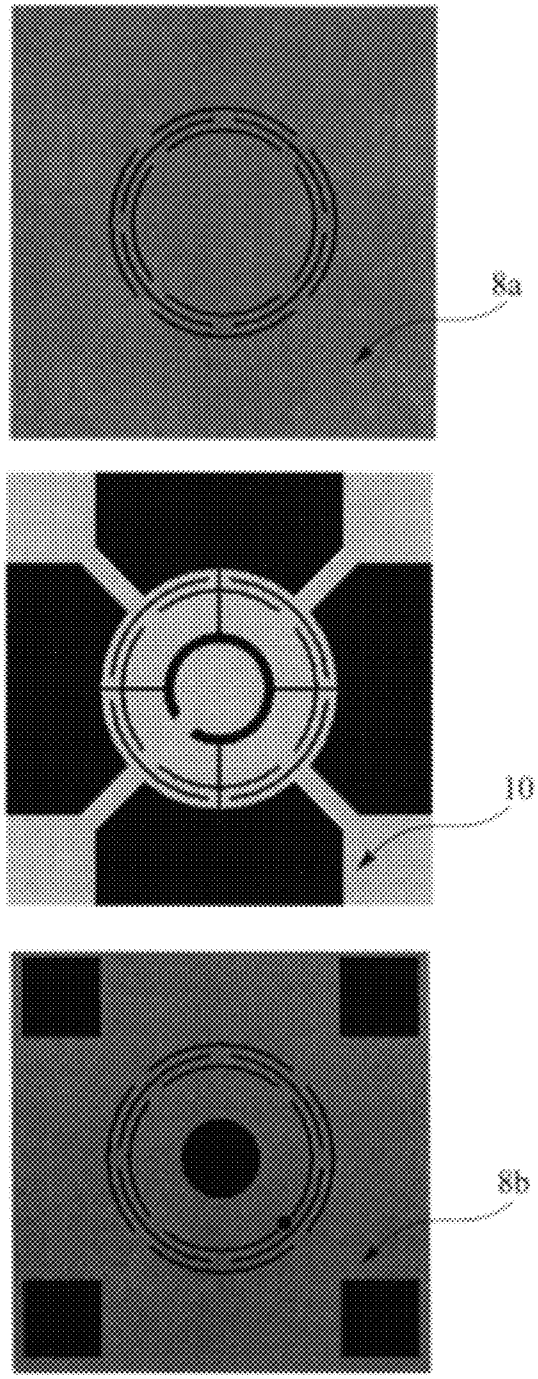
FIG. 5 is a top view of a movable part of a device with an MEMS loudspeaker.
Figure 6:
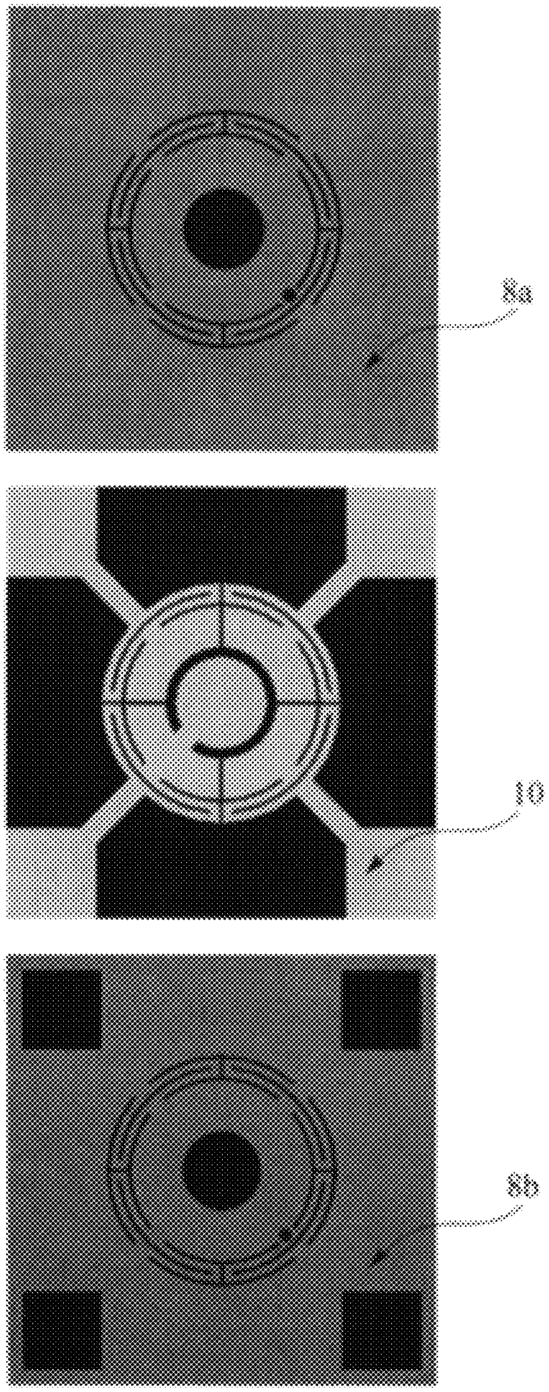
FIG. 6 is a top view of a movable part of a device with an MEMS loudspeaker from another perspective.

As shown in FIGS. 5 and 6, the MEMS loudspeaker is a micro loudspeaker based on micromechanical manufacturing technology, and also serves as an acoustic reproduction device, and an electromagnetic system as an actuator is used to vibrate the diaphragm. The movement of the diaphragm causes pressure fluctuations in ambient air, and such fluctuations are perceived as audio or acoustic variations. Vibration of the diaphragm is driven by an electromechanical drive system, and the electrodynamic MEMS loudspeaker operates based on a Lorentz actuator.

From a scientific perspective, the Lorentz actuator can cause significant displacements. In physics, particularly in electromagnetism, the Lorentz force results from a combination of electric and magnetic forces acting on a point charge in an electromagnetic field. When a charged particle with a charge q moves at a velocity v in an electric field E and a magnetic field B, a certain force is applied thereto.

When signal current of the device flows through a voice coil in a magnetic field of the micro loudspeaker, a force is generated to drive the liquid metal diaphragm 8 of the loudspeaker to move. According to a Lorentz force law FLorentzF_{\text{Lorentz}}, this force is equal to a product of a magnetic flux density B, a coil length l, and time when current I flows through the coil, with details in the formula 1:

$$F_{Lorentz} = Bl\,I; \qquad (1)$$

In the voice coil of the micro loudspeaker, electrons move or oscillate along a common cylindrical path at a constant speed, and an alternating magnetic field, known as a Biot-Savart field, is generated. In physics, particularly in electromagnetism, a Biot-Savart law is a formula that describes a magnetic field generated by electric current. The Biot-Savart law relates to a strength, direction and length of a magnetic field, as well as proximity of current. This law is effective under conditions of magnetostatic approximation and is consistent with Ampère's circuital law and Gauss's law for magnetism.

Micro loudspeakers are essentially deemed as sensors because they convert electrical energy or signals (such as current flow) into mechanical acoustic energy. Without interaction between a static magnetic field and a magnetic field generated by continuously changing charges, acoustic output cannot be achieved.

A force generated by the electrodynamic actuator is applied to a flexible diaphragm, which leads to peak vibrations of the diaphragm. For example, the formula 2 shows that an effective acoustic pressure PrmsP_{\text{rms}}, which can be expressed by a diaphragm peak displacement xpeakx_{\text{peak}}, a diaphragm surface area SS, a vibration frequency ff, and a distance rr from an acoustic source to a listener.

$$P_{rms} = \frac{\pi \cdot \rho \cdot xpeakf^2}{r}; \qquad (2)$$

Additionally, the formula 3 shows how to calculate a sound pressure level (SPL):

$$SPL = 20\ \log\ [Prms]\ 3SPL = 20\ \log\left[\frac{P_{rms}}{P_o}\right]; \qquad (3)$$

The formulas 2 and 3 show that displacement of the diaphragm needs to be larger at a low frequency, depending on a distance between the micro loudspeaker and the listener. In an ear canal application, a single small MEMS loudspeaker is capable of reproducing sounds in an optimal state. However, in a free-field application, the MEMS loudspeaker can operate effectively in an array form. An SPL of the MEMS loudspeaker in the array manner can be calculated through the formula 4, which also depends on other parameters such as distance.

$$SPL = 20\ \log\left[\frac{NP_{rms}}{P_o}\right]; \qquad (4)$$

Table 1 displays an example of calculating SPLs of MEMS loudspeakers in free-field applications at predetermined distances. According to the formula 2, parameters of the MEMS loudspeaker used for the calculation include the diaphragm displacement of approximately 20 μm, the surface area of 3.98 $\mu m^2$, and the vibration frequency of 1 kHz. Power consumption is directly proportional to transmission of the diaphragm displacement, which also depends on other factors such as a length of the coil, where the length of the coil can be generated in a fixed area of the planar micro-coil at the center of the diaphragm.

Table 1 shows the relationships between SPLs and distances of MEMS loudspeakers in free-field applications.

| | Single MEMS loudspeaker | | Array of MEMS loudspeakers (4 × 4) | |
|---|---|---|---|---|
| Distance (cm) | Acoustic pressure (mpa) | SPL (db) | Acoustic pressure (mpa) | SPL (db) |
| 100 | 0.43 | 26.60667 | 6.85 | 50.68907 |
| 50 | 0.86 | 32.62727 | 13.7 | 56.70967 |
| 30 | 1.43 | 37.06424 | 22.8 | 61.14664 |
| 25 | 1.71 | 38.64787 | 27.4 | 62.73027 |

-continued

| | Single MEMS loudspeaker | | Array of MEMS loudspeakers (4 × 4) | |
|---|---|---|---|---|
| Distance (cm) | Acoustic pressure (mpa) | SPL (db) | Acoustic pressure (mpa) | SPL (db) |
| 10 | 4.28 | 46.60667 | 68.5 | 70.68907 |
| 5 | 8.56 | 52.62727 | 137 | 76.70967 |
| 3 | 14.3 | 57.06424 | 228 | 81.14664 |
| 2.5 | 17.1 | 58.64787 | 274 | 82.73027 |
| 1 | 42.8 | 66.60667 | 685 | 90.68907 |

Parameters of MEMS loudspeakers in ear canal applications can be calculated through the formulas 5-7. As sizes of a micro loudspeaker and an ear cavity are relatively smaller than a wavelength of acoustic wave, the acoustic pressure is uniformly distributed in space. A pressure variation is directly proportional to a volume displacement of the diaphragm, which can be expressed as:

$$dP = \frac{1.4P_o}{V_o}dV; \tag{5}$$

$$P = \frac{1.4P_o\Delta V}{V_o}; \tag{6}$$

where $P_0$ is an atmospheric pressure, and $V_0$ is a volume of the ear cavity, approximately 2 mL. A generated SPL is defined as:

$$SPL = 20\log\left[-\frac{1.4P_o\Delta V}{P_{ref}V_o}\right]; \tag{7}$$

| SPL (db) | Amplitude (pa) | Peak airway pressure (pa) | Ear cavity volume ($mm^3$) | Volume displacement (db) |
|---|---|---|---|---|
| 120 | 20.000 | 28.284 | 0.40406 | 101.52287 |
| 115 | 11.247 | 15.905 | 0.22722 | 57.09050 |
| 110 | 6.325 | 8.944 | 0.12778 | 32.10435 |
| 106 | 3.991 | 5.643 | 0.08062 | 20.25648 |
| 105 | 3.557 | 5.030 | 0.07185 | 18.05360 |
| 100 | 2.000 | 2.828 | 0.04041 | 10.15229 |
| 95 | 1.125 | 1.591 | 0.02272 | 5.70905 |
| 90 | 0.632 | 0.894 | 0.01278 | 3.21043 |
| 85 | 0.356 | 0.503 | 0.00719 | 1.80536 |
| 80 | 0.200 | 0.283 | 0.00404 | 1.01523 |
| 75 | 0.112 | 0.159 | 0.00227 | 0.57091 |
| 70 | 0.063 | 0.089 | 0.00128 | 0.32104 |

Table 2 shows examples of SPLs of MEMS loudspeakers in ear canal applications. Parameters of the MEMS loudspeaker used for calculations according to the formulas 5-7 include some factors such as the diaphragm displacement of approximately 20 μm, and the surface area of 3.98 $\mu m^2$ at the vibration frequency of 1 kHz. Power consumption of the diaphragm is related to transmission of the diaphragm displacement, which depends on the length of the coil, where the length of the coil can be generated in a fixed area of the planar micro-coil at the center of the diaphragm.

Table 2 shows the relationships between SPLs and volume displacement changes of MEMS loudspeakers in ear canal applications.

Example 3

This example relates to SPLs and volume displacement changes of an electrodynamic MEMS loudspeaker in ear canal applications. The electrodynamic MEMS loudspeaker or the micro loudspeaker manufactured with micromachining technology is an electro-acoustic transducer that converts electrical signal audio into acoustic signals or sounds. Generally, the electrodynamic MEMS loudspeaker can be divided into two parts: an electromechanical part and a mechanical acoustic part. The two parts are fundamental parts of the electrodynamic MEMS loudspeaker, and determine the operating principle thereof. Therefore, these parts are deemed as essential components for acoustic reproduction and cannot be separated from other parts or omitted, to ensure normal operation of the entire system.

For example, an MEMS loudspeaker 1 includes at least two parts: a static part 2 and a movable part 3, which jointly generate acoustic/audio signals. The static part 2 includes a silicon framework 4 as a permanent magnet platform, further including an acoustic aperture 7, and a permanent magnet 6. A structure of the static part 2 generally has a shape similar to that of the stator assembly of the electrodynamic MEMS loudspeaker.

In this example, a structure of the movable part 3 differs from that of an ordinary diaphragm, the movable part includes liquid metal diaphragms 8*a* and 8*b* fixed on the top of a silicon framework 5, and thin conductor connecting arms 10 formed by connecting arm leads are uniformly distributed on liquid metal diaphragm arms 13, which are connected to a planar micro-coil 9 and contacted with contact pads 12. The thin conductor connecting arms 10 are diagonally distributed on the liquid metal diaphragm arms 13, which facilitates connecting to the planar micro-coil 9 and the contact pads 12 through through-hole connectors 11 therebetween. The thin conductor connecting arms 10 are embedded in the liquid metal diaphragm, diagonally distributed and protected by the liquid metal diaphragm 8. The liquid metal diaphragm 8 also acts as an insulating layer, and isolates the planar micro-coil 9 from the thin conductor connecting arms 10.

An overall structure of the movable part 3 described above enables to achieve optimal acoustic pressure output of the MEMS loudspeaker 1. This is attributed to inherent properties of the liquid metal diaphragm 8, which allows for significant displacement of the diaphragm, thereby producing a higher acoustic pressure. However, when certain assemblies or formed elements of the system are removed or omitted, the entire electrodynamic MEMS loudspeaker will not work normally. Exceptionally, when the device is repurposed as a sound pressure sensor or microphone, this limitation can be ignored. The properties are attributed to flexibility of the liquid metal diaphragm structure and its sensitivity to tiny external sound pressure and wideband frequencies. Liquid metal not only possesses excellent fluidity and thermal conductivity but also achieves better sound pressure output and enhanced audio clarity. Additionally, liquid metal exhibits self-healing properties, thereby being more durable and resilient over long-term use.

General advantages of electrostatic speakers include: a distortion level is one to two orders of magnitude lower than that of a traditional driver; the diaphragm is extremely light, and an entire surface thereof vibrates evenly; and superior frequency response performance in parameters including amplitude and phase, is achieved, because the special principle of force and pressure generation results in less resonance than that of a common electric actuator.

As understood by those skilled in the art, the present disclosure can be implemented in other specific forms without deviating from the scope or basic features. Similarly, specific naming and division of parts, modules, agents, managers, assemblies, functions, processes, operations, layers, features, properties, methodologies and other aspects are not mandatory or significant, and implementation mechanisms of the present disclosure or its features may have different names, divisions, and/or formats.

What is claimed is:

1. An electrodynamic loudspeaker with a micro-electro-mechanical system (MEMS), comprising an MEMS loudspeaker (1), wherein the MEMS loudspeaker (1) is assembled and structured through at least one liquid metal diaphragm (8), comprising:

a noise reduction module, being configured to reduce noise without need for a plurality of software interfaces;

a static part (2), comprising at least one silicon framework, wherein the silicon framework serves as a general magnet platform; and a movable part (3), comprising at least one liquid metal diaphragm (8), wherein the liquid metal diaphragm (8) is fixed to a top of the silicon framework, and the liquid metal diaphragm (8) serves as a component of at least one microphone or loudspeaker.

2. The electrodynamic loudspeaker with an MEMS according to claim 1, wherein connectors (11) are further comprised, and the connectors (11) exist in the form of at least one lead, and a plurality of arms that constitute connecting arms (10) are formed.

3. The electrodynamic loudspeaker with an MEMS according to claim 2, wherein thin conductor connecting arms (10) are further comprised, and the thin conductor connecting arms (10) are uniformly and diagonally distributed on arms of the liquid metal diaphragm (8).

4. The electrodynamic loudspeaker with an MEMS according to claim 3, wherein the thin conductor connecting arms (10) are configured to connect at least one planar micro-coil (9) and a plurality of the connecting arms (10).

5. The electrodynamic loudspeaker with an MEMS according to claim 4, wherein the liquid metal diaphragm (8) employs a stiffness adjustment mechanism to improve movement accuracy and extend an operational bandwidth, and serves as an insulating layer that separates at least one planar micro-coil (9) from the connecting arms.

6. The electrodynamic loudspeaker with an MEMS according to claim 1, wherein the MEMS loudspeaker (1) comprises an acoustic aperture (7).

7. The electrodynamic loudspeaker with an MEMS according to claim 1, wherein the silicon framework comprises a first silicon framework (4) and a second silicon framework (5); and the first silicon framework (4) serves as a movable part of the MEMS loudspeaker (1), and the second silicon framework (5) serves as a static part (2) of the MEMS loudspeaker (1).

8. The electrodynamic loudspeaker with an MEMS according to claim 7, wherein the static part (2) comprises the silicon framework as a permanent magnet (6) platform, an acoustic aperture (7), and a permanent magnet (6).

9. The electrodynamic loudspeaker with an MEMS according to claim 1, wherein the liquid metal diaphragm (8) is forcibly moved by an electric actuator and is connected to a center of the liquid metal diaphragm (8).

10. The electrodynamic loudspeaker with an MEMS according to claim 3, wherein the thin conductor connecting arms (10) are symmetrically distributed on the liquid metal diaphragm (8) and move in a manner of piston motion.

* * * * *